Jan. 24, 1961 H. J. MUMMA 2,969,136
MACHINE FOR HANDLING EGGS
Original Filed June 1, 1953 17 Sheets—Sheet 7
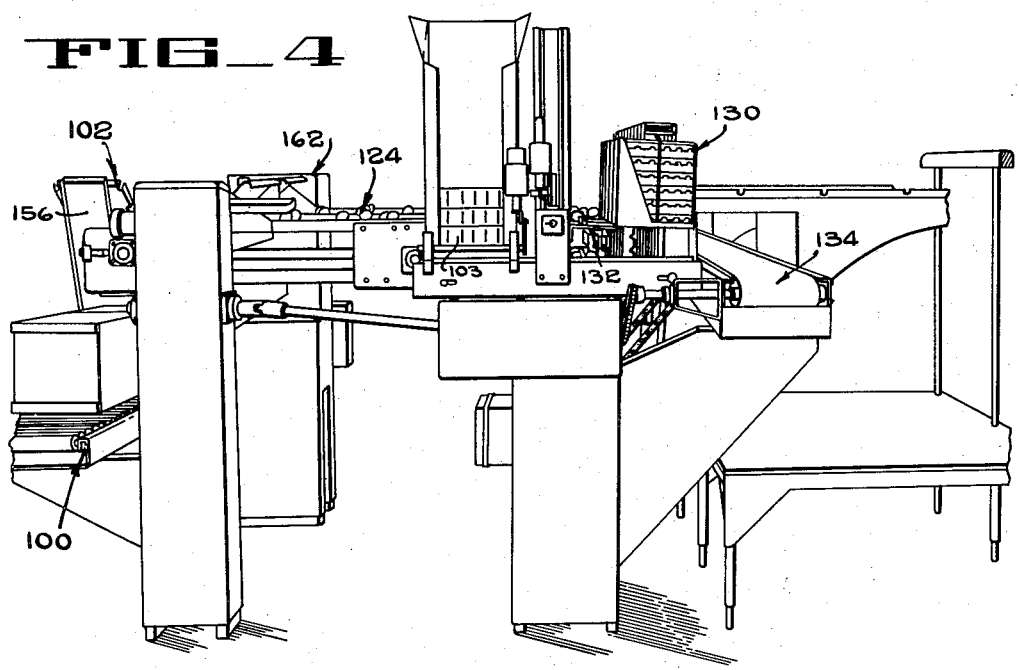
FIG_4
INVENTOR
HAROLD J. MUMMA
BY
ATTORNEY

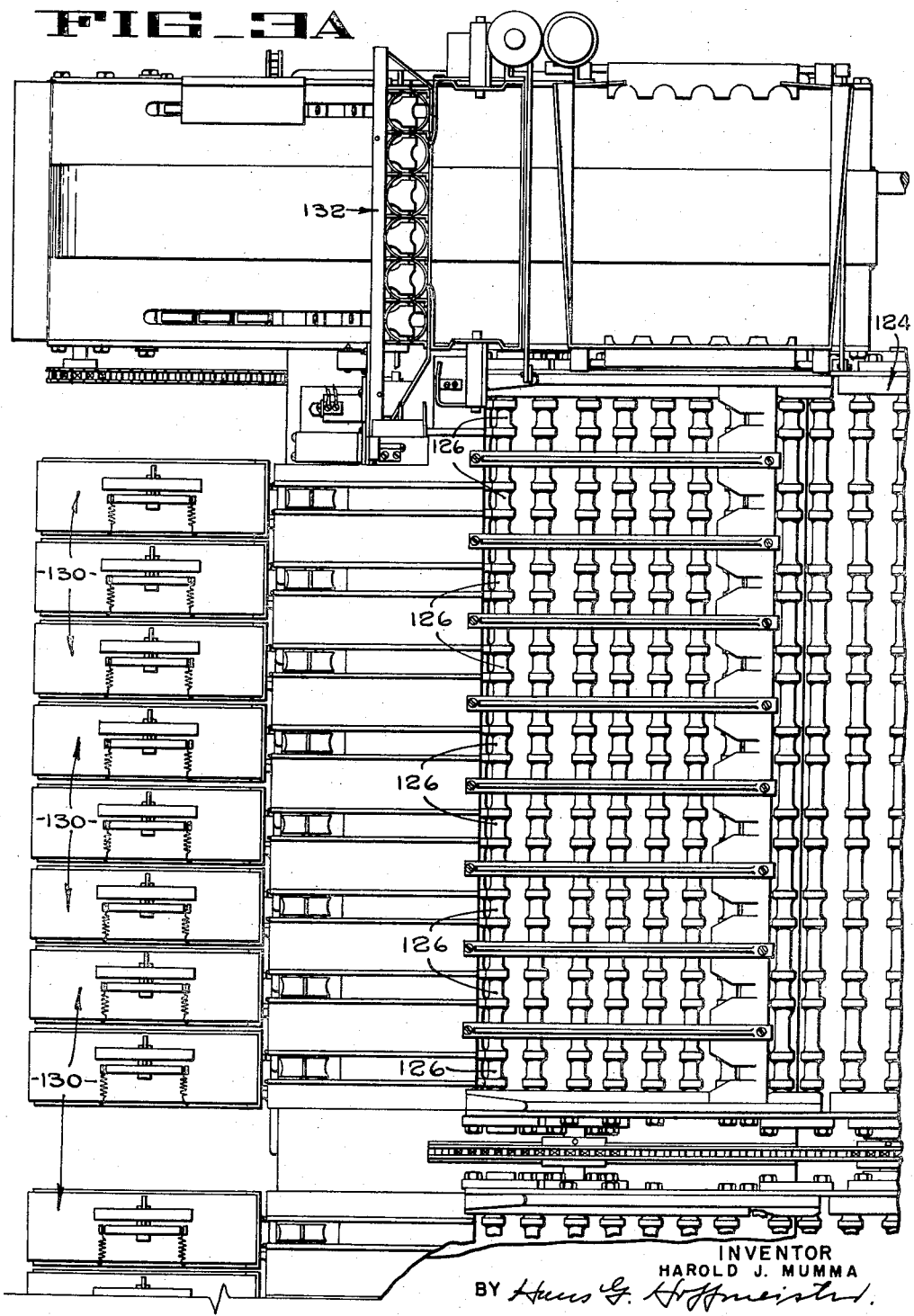

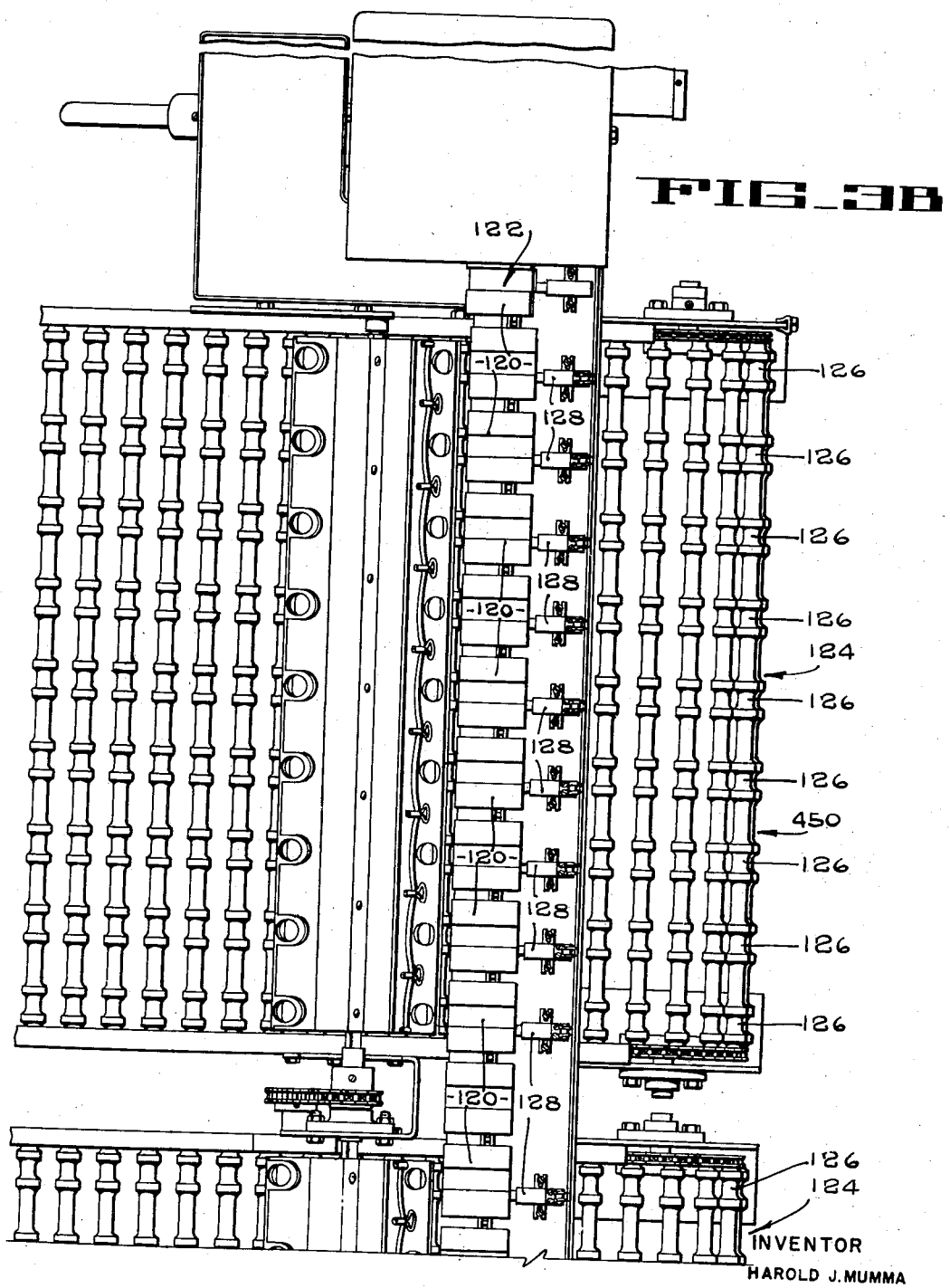

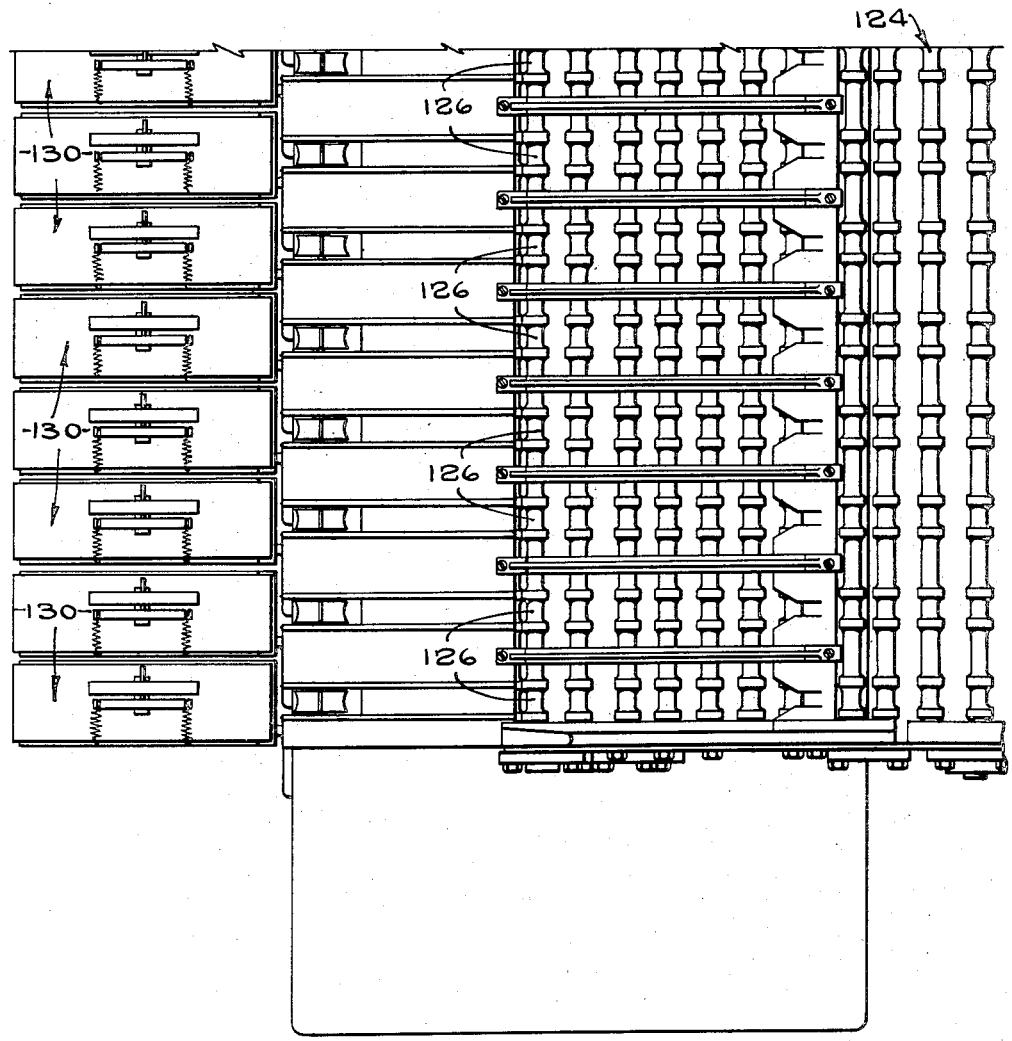

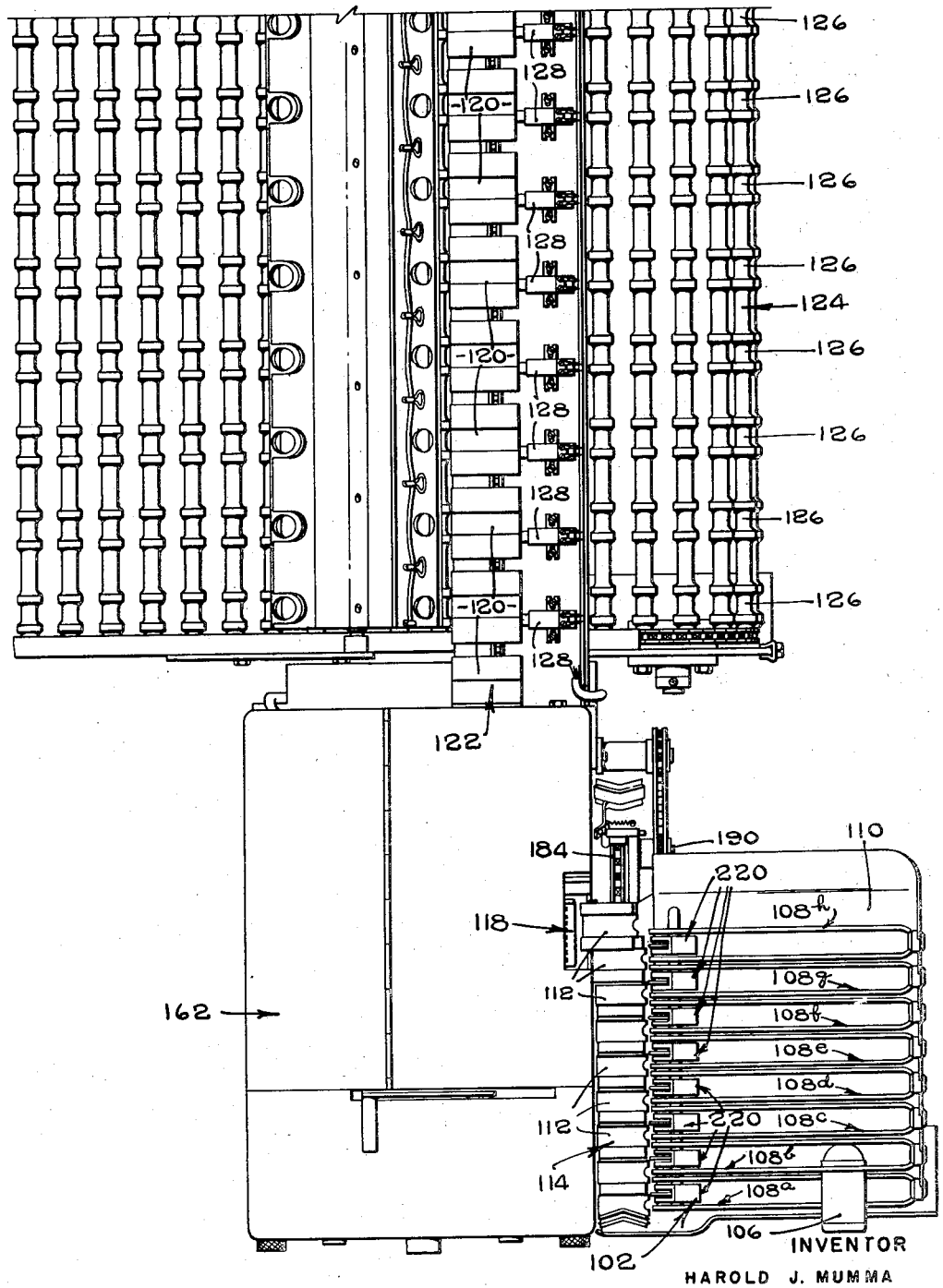
FIG_30

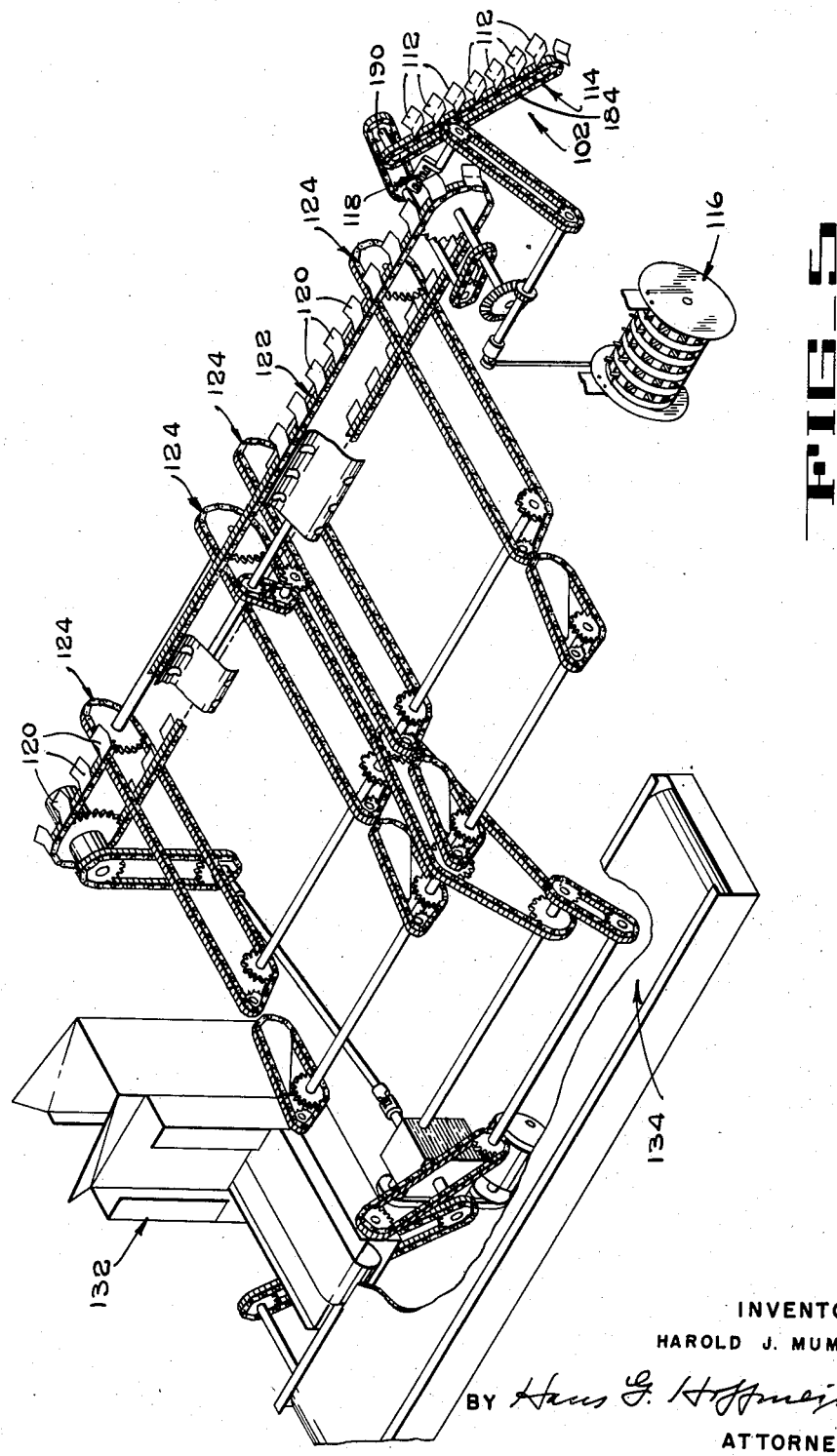

Jan. 24, 1961   H. J. MUMMA   2,969,136
MACHINE FOR HANDLING EGGS
Original Filed June 1, 1953   17 Sheets-Sheet 9
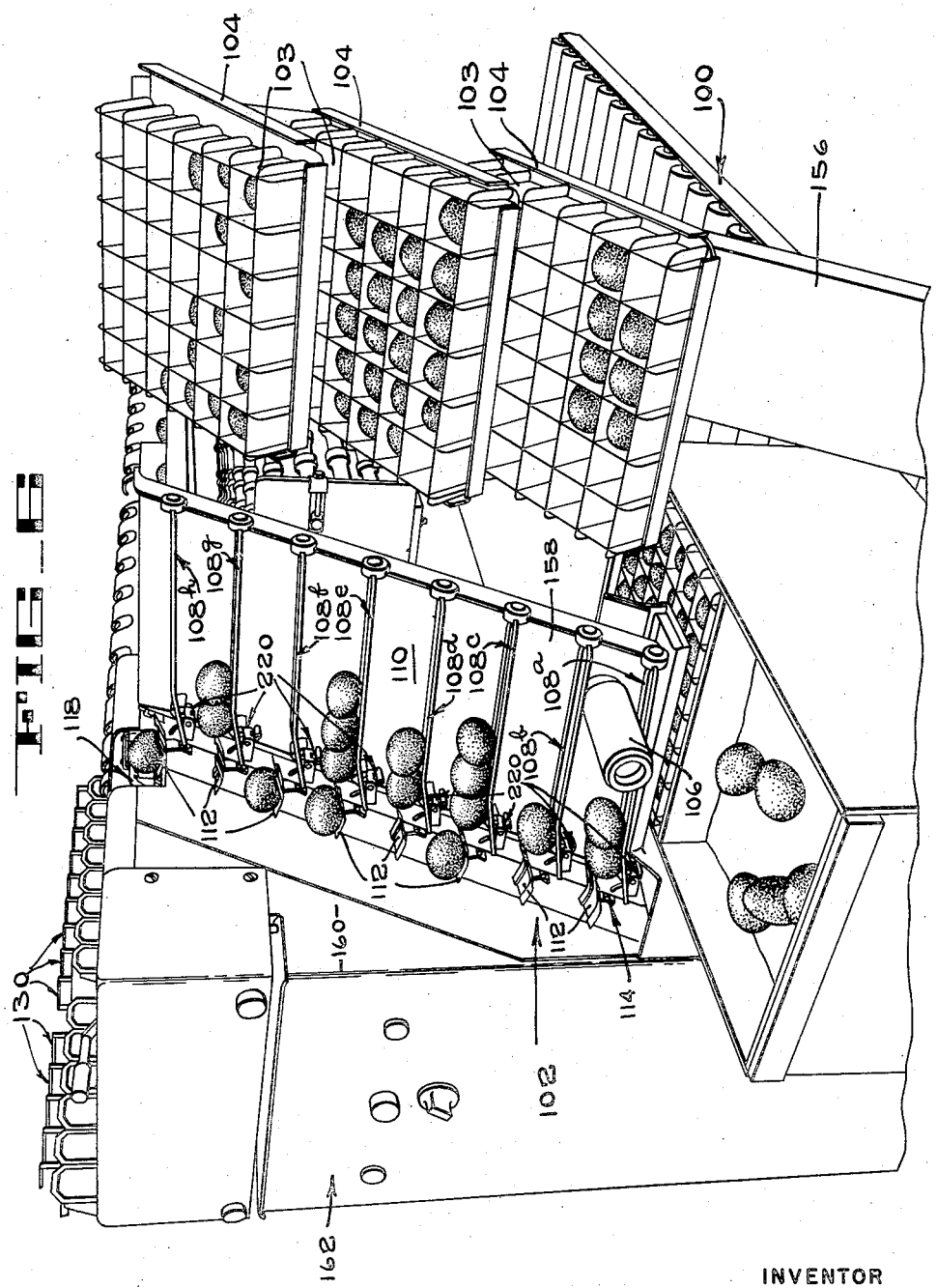
INVENTOR
HAROLD J. MUMMA
BY Hans G. Hoffmeister
ATTORNEY Jan. 24, 1961 H. J. MUMMA 2,969,136
MACHINE FOR HANDLING EGGS
Original Filed June 1, 1953 17 Sheets—Sheet 10
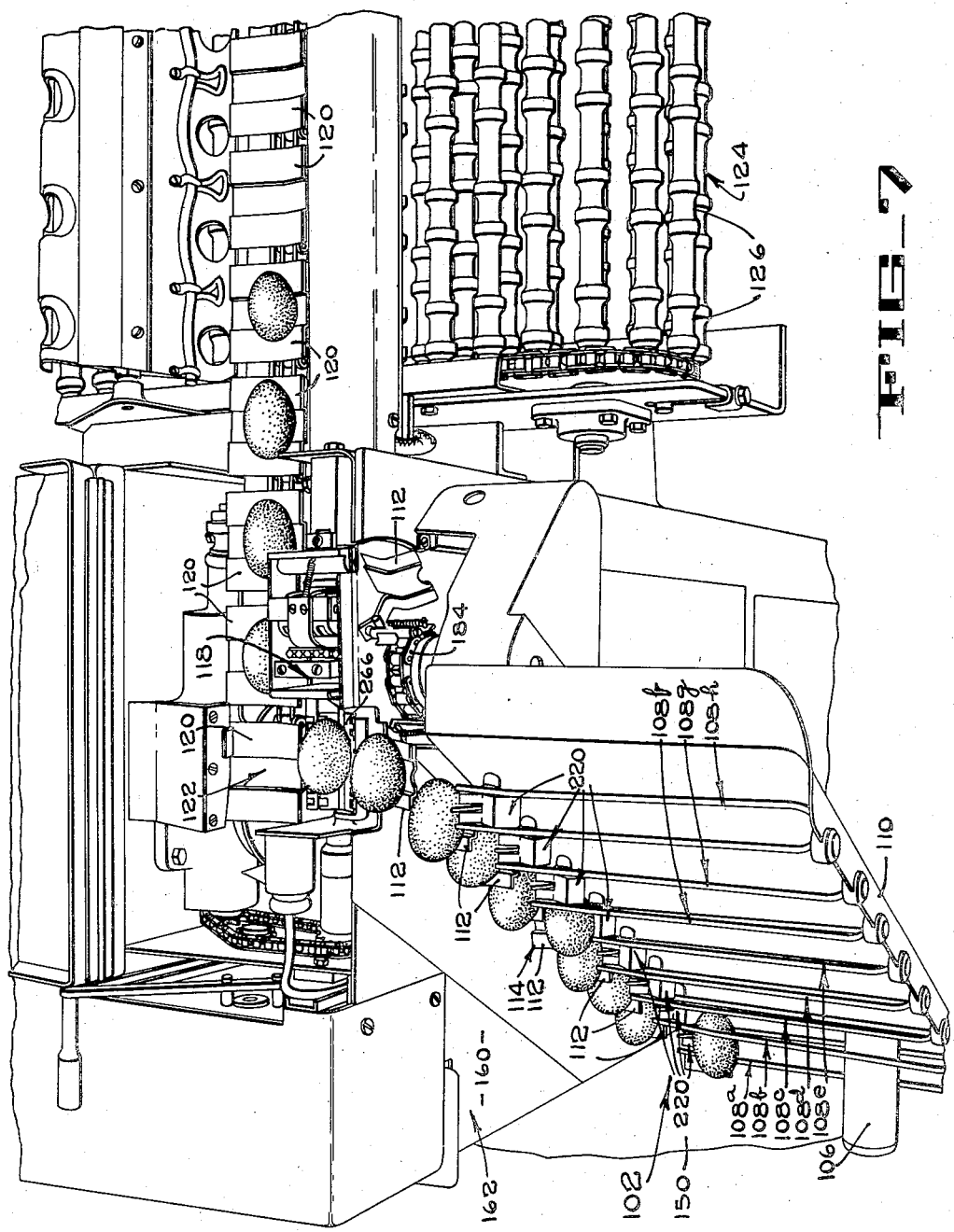
FIG_7
INVENTOR
HAROLD J. MUMMA
BY
ATTORNEY

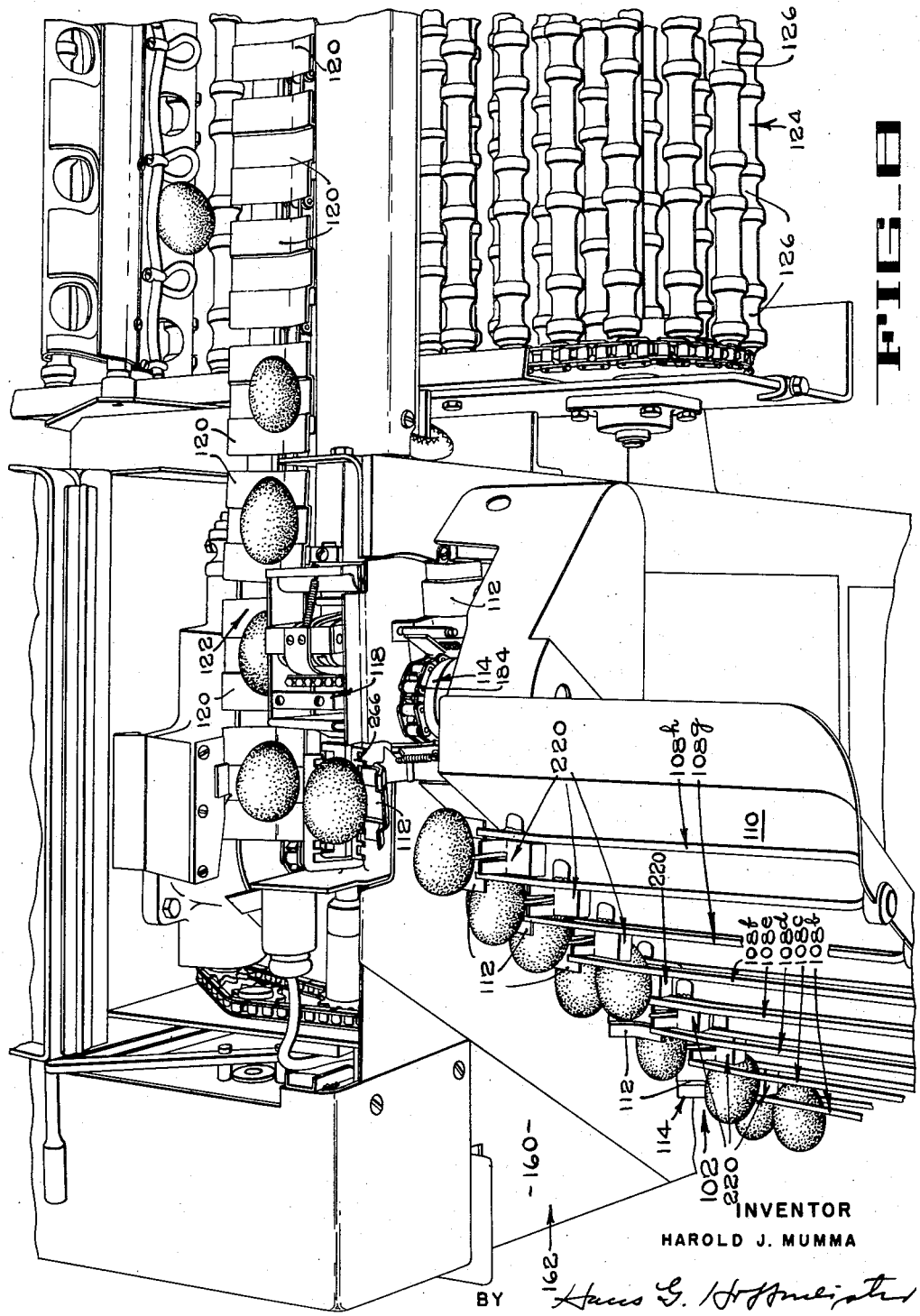

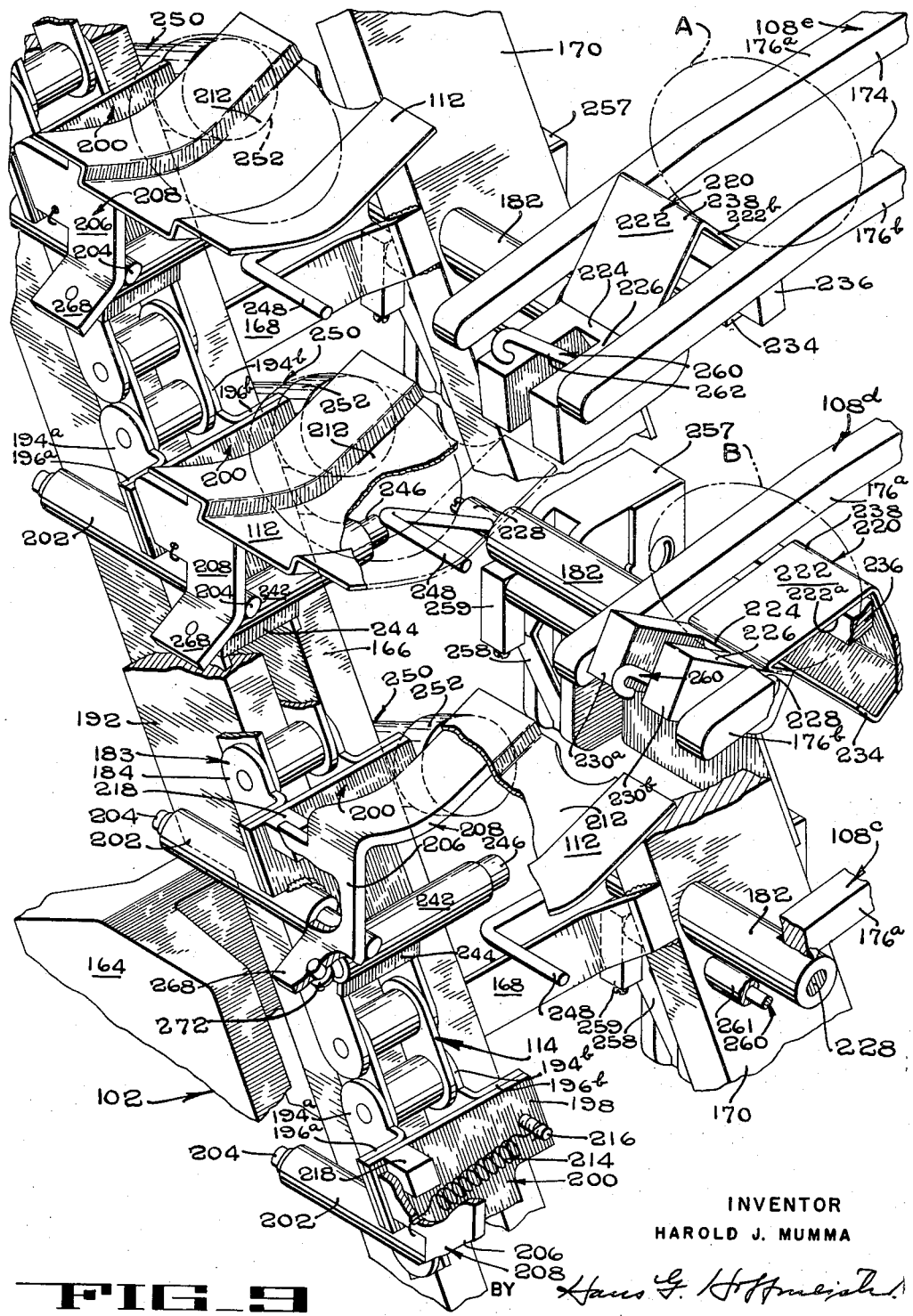

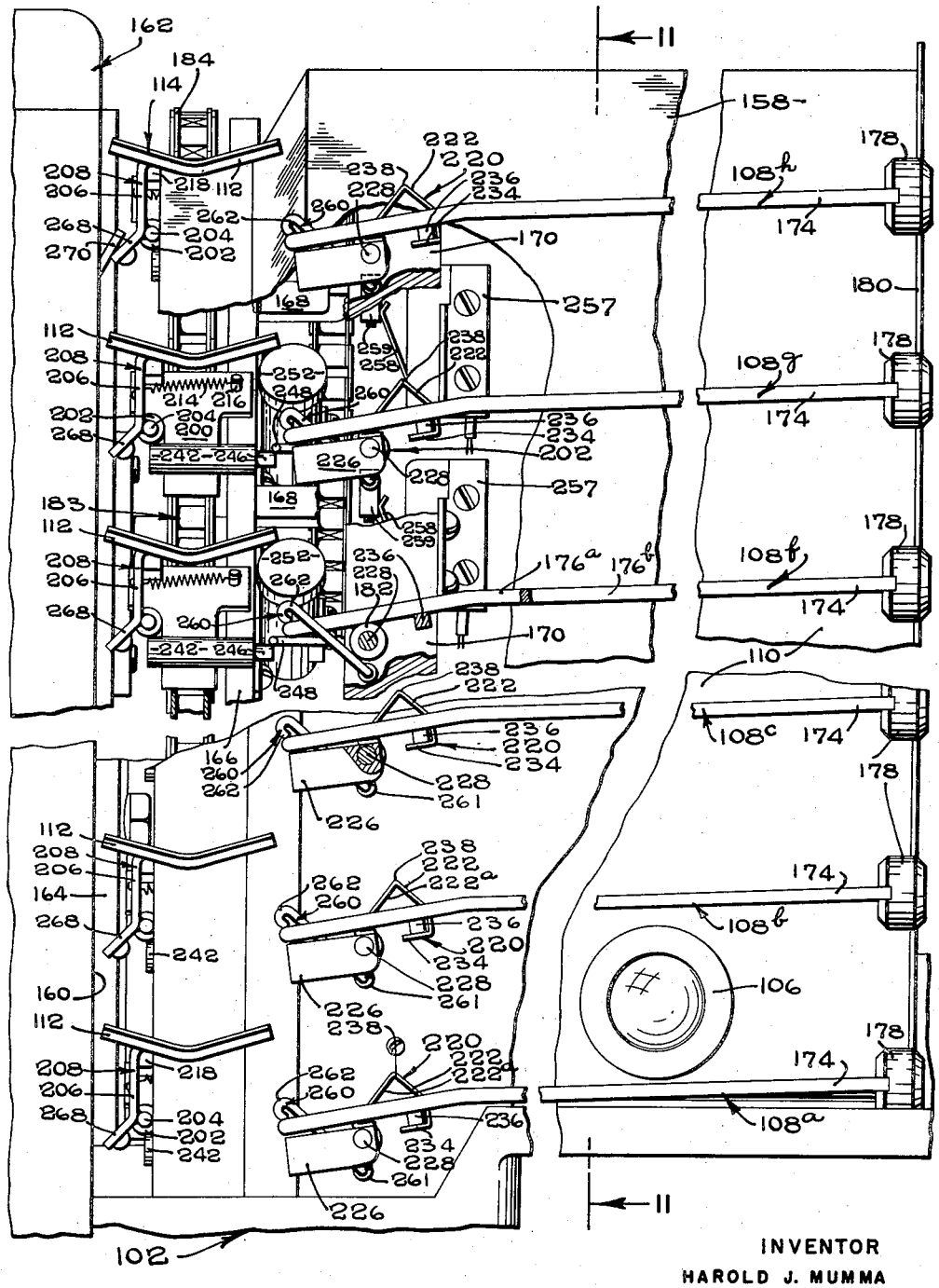

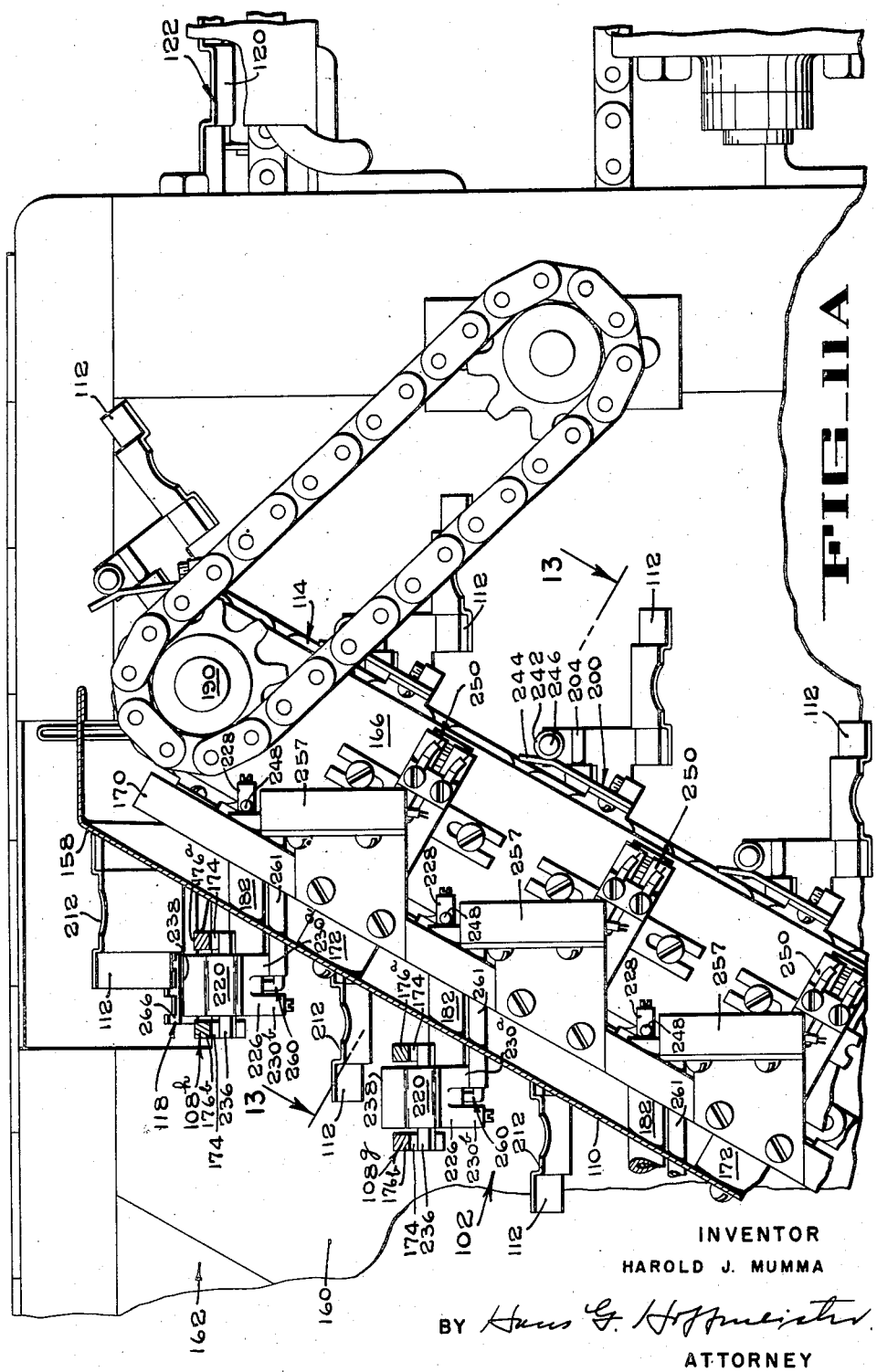

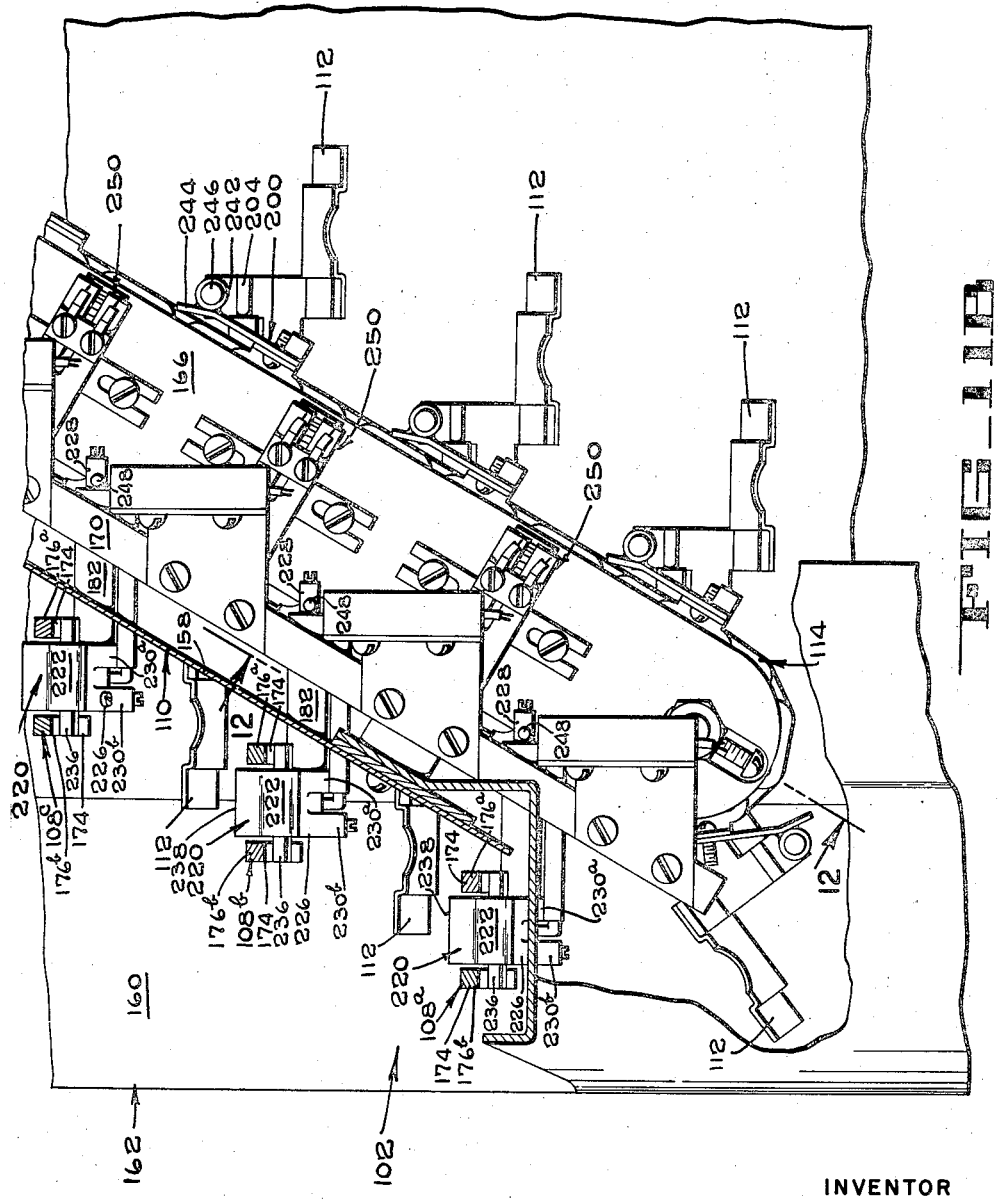

Jan. 24, 1961 H. J. MUMMA 2,969,136
MACHINE FOR HANDLING EGGS
Original Filed June 1, 1953 17 Sheets-Sheet 16
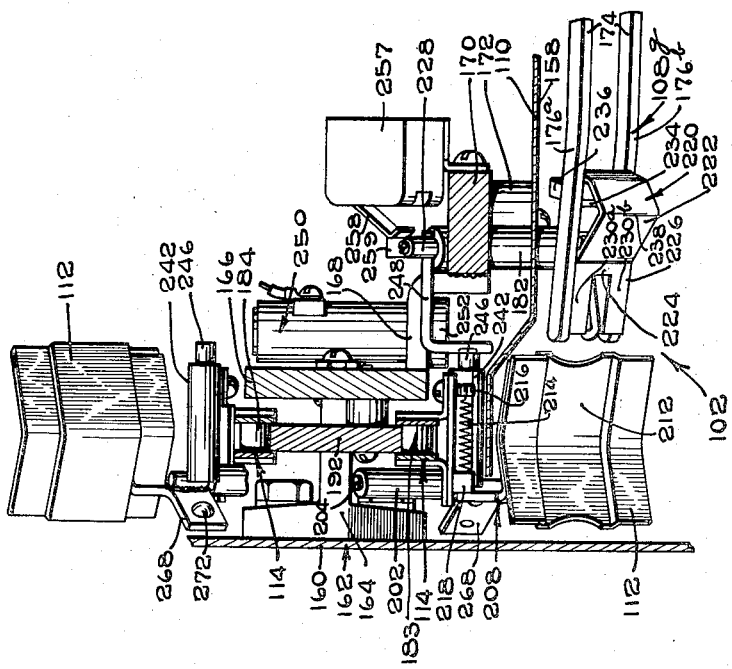
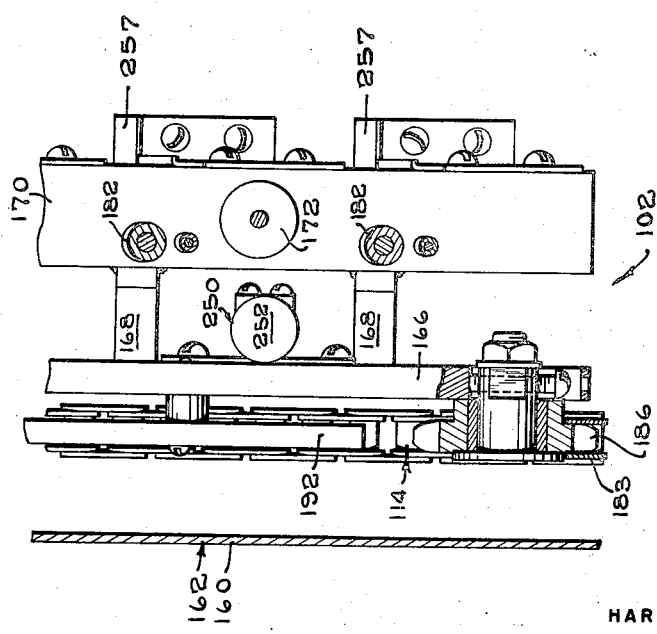
INVENTOR
HAROLD J. MUMMA
BY
ATTORNEY

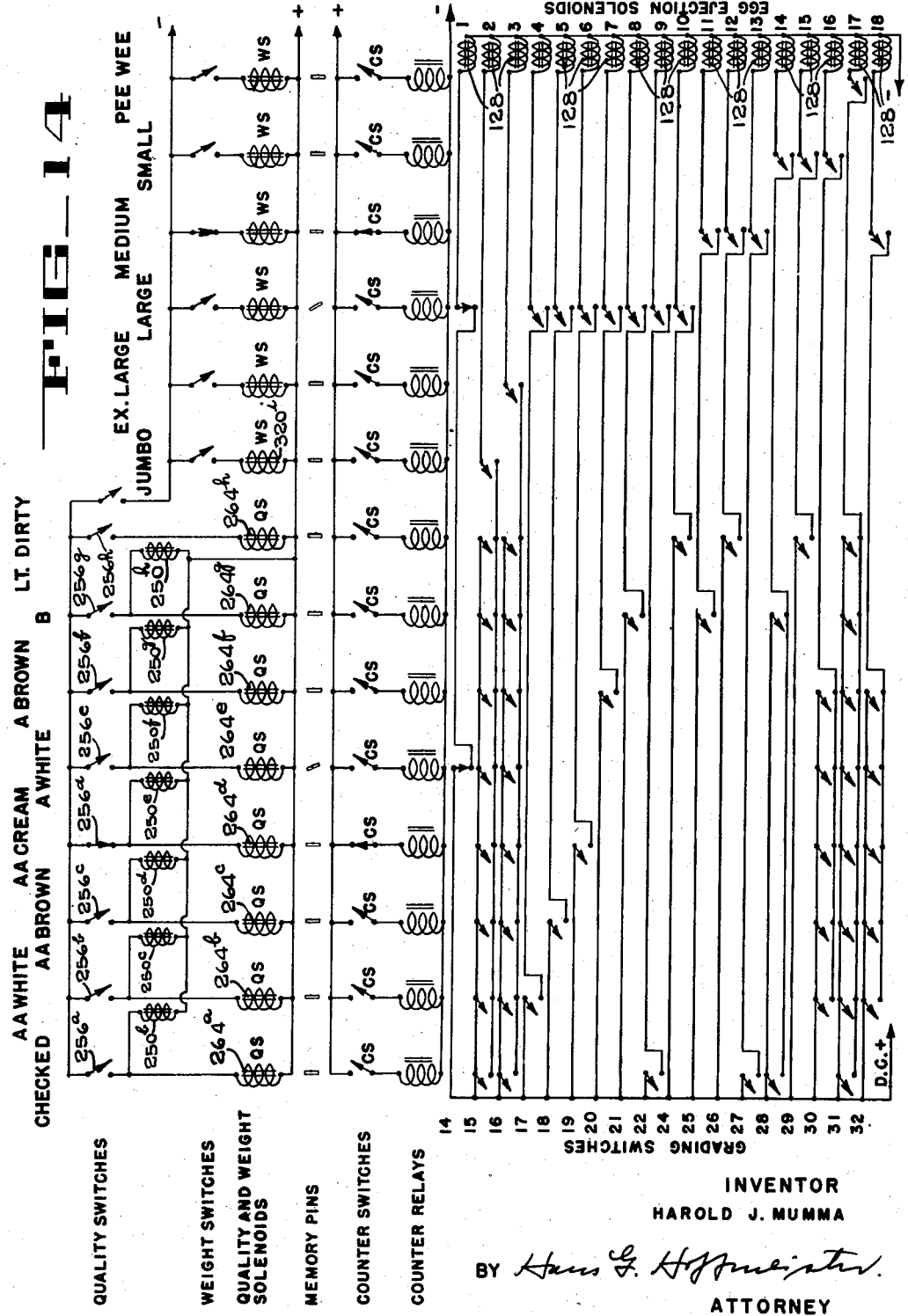

United States Patent Office 2,969,136
Patented Jan. 24, 1961

2,969,136

MACHINE FOR HANDLING EGGS

Harold J. Mumma, Riverside, Calif., assignor to Food Machinery and Chemical Corporation, San Jose, Calif., a corporation of Delaware Original application June 1, 1953, Ser. No. 358,621. Divided and this application Nov. 15, 1956, Ser. No. 622,386

12 Claims. (Cl. 198—26)

The present invention relates to machines and apparatus for handling eggs. More particularly, the present invention relates to machines and apparatus that assist in segregating the eggs received from the producers into desired classification groups according to quality and weight and which pack, or facilitate the packing of eggs of the same classification into cartons or cases for shipment to distributors and consumers.

This application is a division of my copending application, U.S. Serial No. 358,621, filed June 1, 1953, for a Machine for Handling Eggs.

An object of the present invention is to provide an improved supply chute for egg conveyors.

Another object of the present invention is to provide a supply chute for an egg handling machine wherein the passage of eggs from the chute is controlled by the egg conveyor.

Another object of the present invention is to provide an egg handling machine wherein the passage of eggs from the chutes thereof are registered.

Another object of the present invention is to provide an egg handling machine wherein the eggs on the supply chute are blocked until the approach of an empty cup advanced by the egg conveyor.

These and other objects and advantages of the present invention will become apparent from the following description and drawings wherein:

Figs. 3A, 3B, 3C, 3D are the four quarters of a plan view of the total machine.

Fig. 4 is a perspective of the machine viewed from the side opposite to the feed end thereof.

Fig. 5 is a fragmentary schematic perspective illustrating the various power trains by means of which the movable components of the machine are driven from a common source of rotary power.

Fig. 6 is an enlarged perspective of the feed end of the machine showing an inclined board having a plurality of superposed shelves or racks upon which the operator deposits the eggs according to their different qualities, and an elevator arranged to remove the eggs from said shelves to carry them to a weighing mechanism.

Fig. 7 is another perspective of the feed end of the machine viewed from a higher level than Fig. 6.

Fig. 8 is a perspective similar to Fig. 7 illustrating a directly succeeding phase in the operation of the mechanisms shown therein.

Fig. 9 is an enlarged fragmentary perspective of the quality racks and of the feed elevator with certain parts removed to expose structure underneath.

Fig. 10 is a fragmentary front elevation of quality racks and of the feed elevator with certain parts removed to expose structure underneath.

Figs. 11A and 11B are the upper and lower halves of a fragmentary vertical section through the quality racks taken along lines 11—11 of Fig. 1 and viewed in the direction of the arrows associated with said line.

Fig. 12 is a fragmentary section along lines 12—12 of Fig. 11B as viewed from the front end of the machine.

Fig. 13 is another section taken along lines 13—13 of Fig. 11A and viewed in the direction of the arrows associated with said line.

Fig. 14 is a circuit diagram illustrating the manner in which the egg-quality recording and the egg-weight recording components of the memory drum are actuated and in turn control discharge of the eggs from the distributing conveyor onto the classification conveyor.

Construction and operation of the machine

Figure 1:
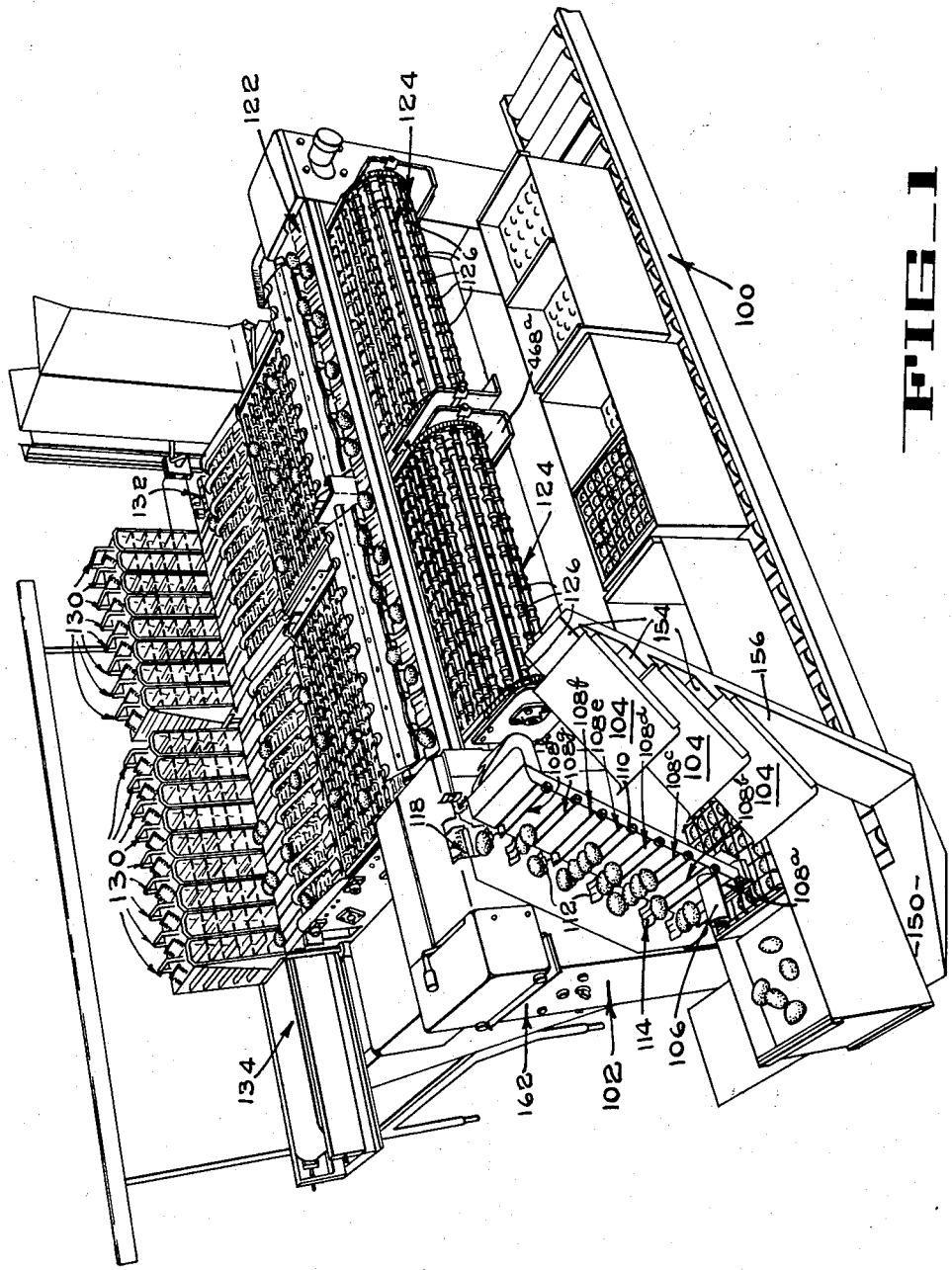
Fig. 1 is a perspective of the total egg handling machine of the invention viewed from a point in front and to the right of the feed end thereof.

The egg handling machine of the invention (Figs. 1, 2 and 4) comprises a supply conveyor 100 which may have the form of a slightly inclined roller conveyor, whereupon cases or crates with eggs are delivered to the candling station 102. At the candling station, the operator takes the eggs from the cases or crates, checks them first for external appearance and places those that are deformed, excessively dirty or broken into the pockets of cardboard grids 103 on special trays 104 that are located at his right side. Those found to be of satisfactory external appearance, he views against a light beam emitted from a suitable electric torch 106 and places them according to their color and internal quality upon the proper racks or shelves 108 of a reclining grading board 110 that has eight such shelves or racks, 108a, 108b, 108c, 108d, 108e, 108f, 108g and 108h in superposed relation. From the racks or shelves 108 which are laterally inclined, the eggs slide onto the cups 112 of a single file elevator 114 while actuating electric mechanisms that register the quality of every egg according to the rack or shelf from which it is supplied to the conveyor on a rotary memory device 116 (Fig. 5), that moves in synchronism with the elevator 114 and which possesses quality recording members corresponding to every one of the cups 112 that pass by and may receive an egg from the racks or shelves of the grading board 110. The elevator 114 lifts the eggs successively to the level of, and delivers them into a weighing mechanism 118 which weighs each egg and registers its weight by electrical impulses on the memory device 116 with the aid of weight recording members thereof that are aligned with the previously mentioned quality recording members. From the weighing mechanism 118 the eggs are transferred onto cups 120 carried by the elongated horizontal run of a single file conveyor 122 which passes at right angles over another conveyor 124 that comprises as many parallel lanes 126 as there are different quality/weight classification groups provided for in the machine. The cups 120 on the horizontal run of the single file conveyor 122 advance in synchronism with both the feed elevator 114 and the memory device 116, hence, as an egg passes from the aforementioned feed elevator 114 onto the weighing mechanism 118 and from there onto a cup 120 of the single file conveyor 122, the cup 120 on the latter conveyor that receives the particular egg steps into the synchronous relation with the quality and weight recording members of the memory device 116 which, up to this point, was held by the elevator cup 112 that passed the egg to the weighing mechanism.

Above each classification lane 126 of the multilane conveyor 124 mechanism is provided in the form of solenoids 128 (Figs. 3B and 3D) that are operable to tip the cups 120 of the single file conveyor 122 as they pass above said classification lanes so as to deliver the eggs from said cups into selected ones of said classification lanes. Energization of each of said solenoids 128 (Figs. 3B and 3D) is arranged to require the simultaneous closure of at least two series-connected normally open switches whose position may be adjustable relative to the hereinbefore mentioned memory device and which may be closed depending upon their position by selected ones of the hereinbefore mentioned quality and weight recording members of said device whenever a cup carrying an egg of the selected quality and weight combination passes over a particular preselected lane 126 of the classification conveyor 124. Thus as the single file conveyor 122 carries the eggs over the various parallel lanes 126 of the classification conveyor 124, it distributes said eggs under control of the memory device into the proper classification lanes of said conveyor 124 so that each of said lanes will receive only eggs of predetermined quality and weight combinations.

Figure 2:
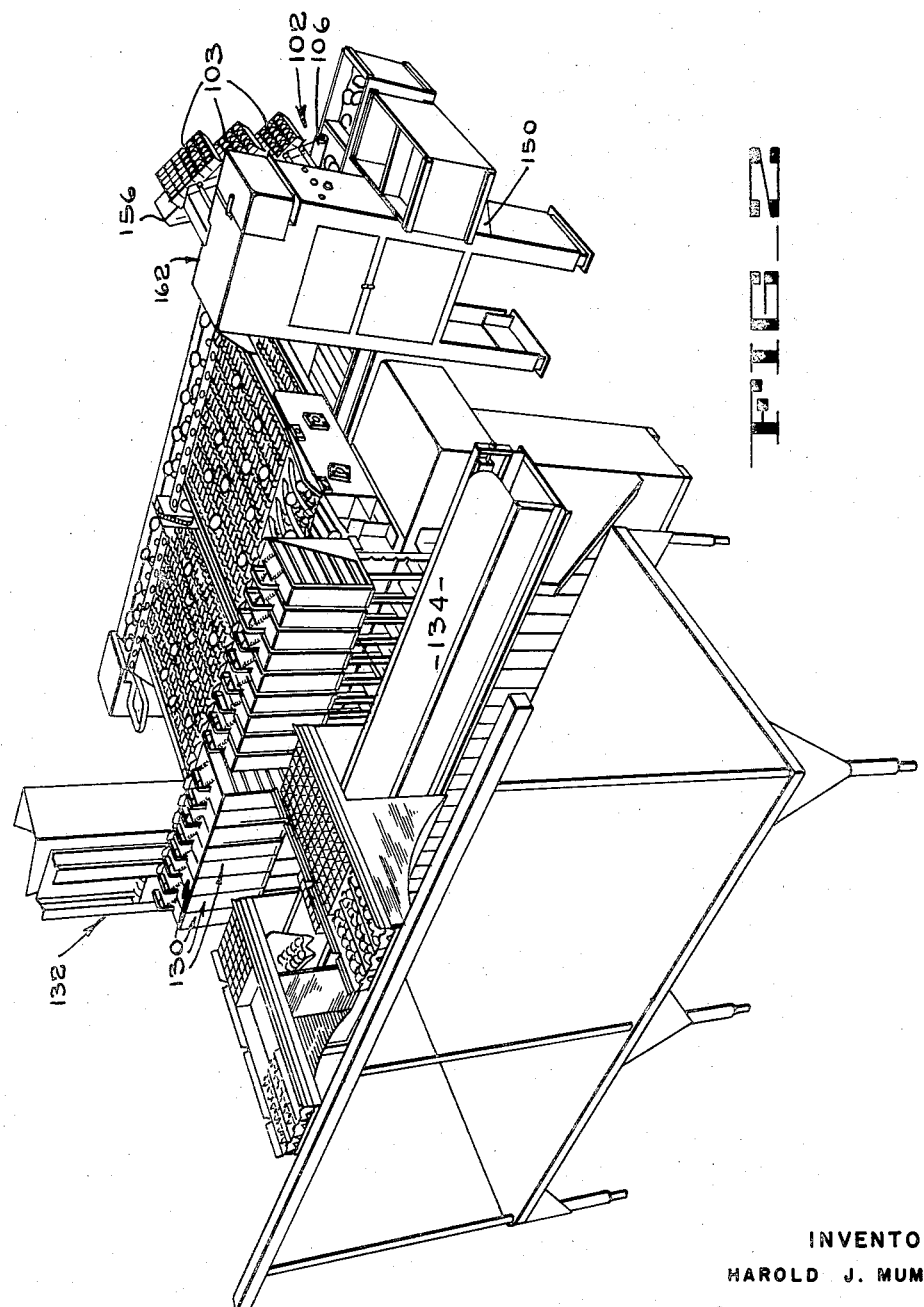
Fig. 2 is another perspective of the total egg handling machine viewed from a point in front and to the right of the egg discharge end thereof.

The classification conveyor 124 may be arranged to feed the segregated eggs to egg accumulators 130 which are provided at the end of each classification lane and which operate to arrange the eggs in superposed tiers or rows. Alternatively, the classification lanes of transverse conveyor 124 may be arranged to feed the eggs into an automatic carton filling mechanism 132 and the automatically filled cartons are then delivered onto the upper run of a take-off conveyor 134 extending along the discharge end of the classification lanes 126 as best shown in Fig. 2.

*Quality grading board and feed elevator for the weighing mechanism*

The operator receives open crates of eggs as supplied from the producer on a platform 150 at the lower end of the previously mentioned inclined roller conveyor 100 as shown in Fig. 1. In taking the eggs out of the crates, he immediately rejects excessively soiled or broken eggs by transferring them into one of the cardboard grids 103 on the hereinbefore mentioned trays 104. Said trays 104 are preferably inclined toward the operator and may be pivotally mounted in superposed relation upon a series of inclined base plates 154 that project in candelabrum fashion from a reclining support post 156 which rises from the platform 150 at the right side of the conveyor 100.

The hereinbefore mentioned grading board 110 is preferably mounted directly above the end of the roller conveyor 100 a distance only slightly larger than the depth of the egg crates so that a crate delivered from the conveyor onto the platform may position itself with its open end directly below and in front of the grading board 110 (Fig. 6).

The grading board may comprise a reclined base plate 158 which may suitably be supported from the adjacent side wall 160 of a cabinet 162 that encases the hereinbefore mentioned weighing mechanism 118 and the memory drum 116. For this purpose, said side wall 160 carries a bracket member 164 which supports a reclining bar 166 (Figs. 9 and 13), and supported from said reclining bar by suitable angle members 168 is another reclining bar 170 to which base plate 158 is bolted with suitable spacer bushings 172 maintaining said plate a limited distance in front of the reclining bar 170 as best shown in Figs. 11A and 11B. Disposed in front of the base plate 158 are the eight superposed racks 108 which decline toward the left edge of said plate as previously pointed out. All of said racks are formed by bars 174 of hairpin shape having spaced parallel legs 176a and 176b of preferably rectangular cross section. At the juncture of said legs, the bars 174 are mounted in circular blocks 178 that are seated upon the edge of a flange 180 which is formed by the upwardly turned right edge of the base plate 158 (Fig. 10). The free left ends of bars 174 are slightly bent downwards to increase the downward gradient of the slanting legs 176a and 176b at their inner ends, and the downwardly bent left ends of the inner legs 176a of said bars rest upon tubular arms 182 that are mounted in and project outwardly from the reclining bar 170 through the base plate 158, as best shown in Figs. 9, 11A and 11B.

Upon viewing the eggs against the hereinbefore mentioned torch 106, which is mounted in and projects forwardly from the base plate 158 between the two lowermost racks, (Figs. 6 and 10), the operator rejects those eggs found to be too old or containing internal impurities, transferring them onto one or the other of the hereinbefore described trays 104. Those found acceptable he places upon appropriate one of the above described eight racks 108 according to their quality. Thus, he may place the eggs graded as "light dirty" upon the top rack 108h, those graded as B upon the second rack 108g counted from the top, etc., with the bottom rack 108a receiving those classed as "checked."

Disposed adjacent the lower ends of the racks 108 is the rearwardly inclined rising run 183 of the hereinbefore mentioned feed elevator 114 which receives the graded eggs from the racks into the before-mentioned cups 112 and delivers them to the weighing mechanism 118. Said elevator comprises an endless sprocket chain 184 trained about an idler sprocket 186 (Fig. 12), that is adjustably supported from the reclining bar 166, and a drive sprocket that is firmly mounted upon a short transverse shaft 190 (Fig. 5) which is rotatably supported in the upper end of the bar 166. The rising run 183 of the sprocket chain 184 rides upon and along the upper edge of another reclining bar or plank 192 (Figs. 9 and 13) which extends parallel to and is supported from the reclining bar 166.

At intervals equal to the distances between the quality racks 108, the parallel links 194a and 194b of the elevator chain are provided with outwardly turned lugs 196a and 196b, respectively, which carry the cross bar 198 or a T-shaped plate 200. Secured to the left inner corner of each T-shaped plate 200, as viewed in Fig. 9, is tubular bearing 202 that is horizontally positioned when traveling along the ascending run of the elevator and within which is rotatably anchored a pivot stud 204. Secured to the outwardly projecting end of each said pivot studs 204 is the vertically rising stem 206 of an arm 208 that extends transversely across the elevator chain. Said arm 208 is of concave conformation and carries the actual cup 112 which has the form of a shallow concave plate that is traversed by a centrally located recess or depression 212 extending approximately in the same direction as the bars 176a and 176b of the racks 174. Said recess 212 is of a width about equal to the distance between said bars. Thus, the cup plate 112 presents to an egg delivered thereinto from one of the racks 108 at least two points of support that are spaced from each other in a direction axially of the egg. A spring 214 tensioned between the vertical stem 206 of arm 208 and a stud 216 upon the opposite end of the cross bar 198 of the T-shaped mounting plate 200 yieldably holds said stem against a stop member 218 secured to said same cross bar 198 and in this manner maintains the cup 112 in a substantially horizontal position wherein it is adapted to support an egg thereon when traveling along the rising run of the elevator.

Interposed between the lower ends of the racks 108 and the rising run of the elevator 114 are gate mechanisms 220 which normally block exit of the eggs from the racks but may temporarily be disabled by the approach of an empty cup on the rising conveyor run to permit discharge of an egg from the rack whenever an empty cup on the conveyor is available for its reception. Each of the normally closed gate mechanisms 220 is formed by a knee-shaped plate 222 disposed between the parallel legs 176a and 176b of its respective rack near the discharge end thereof (Fig. 9). Said plate 222 is secured to the cross bar 224 of a U-shaped member 226 which is firmly mounted upon a spindle 228 that projects from, and turns in, the hereinbefore mentioned tubular arm 182 upon which the leg 176a of the rack bar 174 is supported. The weight of the parallel legs 230a and 230b of the U-shaped member 226 urges the gate 220 in counterclockwise direction as viewed in Figs. 9 and 10 to an extent determined by engagement of a lip 234, formed at the free end of the knee-shaped plate 222, with a fillet 236 extending between and secured by the lower faces of the rack bars 176a and 176b. When in said counterclockwise position, the knee-shaped crest 238 of each plate 222 projects above the level of the rack bars 176a and 176b and in this manner prevents any egg placed onto, and gravitating down said rack, from escape as best shown in phantom lines at A in Fig. 9.

Means are provided to actuate each gate mechanism 220 to swing its knee-shaped plate 222 in clockwise direction as viewed in Fig. 9 into the position illustrated at B in said Fig. 9 whenever an empty cup approaches the discharge end of its respective rack. For this purpose, a tubular bearing 242 extending in a direction transversely of the elevator chain 184 is welded to the lower end of the center bar 244 of each T-shaped mounting plate 200, and slidably disposed within each of said tubular bearings is a trip finger 246 that protrudes normally beyond the right end of said bearings as viewed in Fig. 9. The protruding tips of the fingers 246 are arranged to engage L-shaped arms 248 projecting radially from the hereinbefore described spindles 228 of the U-shaped gate members 226 into the path of said finger tips and swing them clockwise as viewed in Fig. 9. When an L-shaped arm 248 is moved in the described manner, the gate mechanism 220 with which said arm is associated, swings in clockwise direction until the rising portion 222a of its knee-shaped gate plate 222 comes against the fillet and lies flat below the bars 176a and 176b of the rack as illustrated at B in Fig. 9. Now an egg that formerly pressed against the descending run 222b of the knee-shaped plate 222 as illustrated at A in Fig. 9 may roll over the rising portion 222a of said plate, as shown in phantom lines at B in said Fig. 9. Then, as it comes against the upturned legs 230a and 230b of the U-shaped gate member 226, its momentum swings the total gate mechanism in counterclockwise direction back into its initial position, as determined by engagement of lip 234 with fillet 236 because the continuously advancing finger 246 on elevator 114 has meanwhile released the L-shaped arm 248. As a result thereof, the egg is now free to roll from the rack into the directly succeeding elevator cup 112 that registers at the moment with the rack 108. Discharge of other eggs from the same rack, however, is positively prevented by the described return of the gate mechanism to its initial position.

Means are provided that disable the protruding trip fingers 246 by pushing them back into their tubular bushings 242 whenever a succeeding elevator cup receives an egg. For this purpose, the hereinbefore mentioned reclining bar 166 carries opposite the ends of each but the lowermost grading rack, a solenoid 250 (Figs. 9 and 10) whose armature has a buffer-shaped head 252 that is normally seated slightly behind the path of the protruding finger tips 246 as they rise with and along the ascending run of the elevator 114. The power circuit of each of said solenoids includes a normally open switch 256 (Fig. 14) housed in a switch box 257 that may be bolted to the reclining bar 170 (Figs. 10, 11A and 11B). Each of said switches 256 has an arm 258 that is operated by a camming block 259 which is mounted upon an actuating spindle 260 rotatably received in a tubular spindle 261 that is supported in reclining bar 170. The actuating spindle 260 of each of said switches 256 extends to a point below the bars 176a and 176b of its respective rack and is provided with a radially directed arm 262 that rises above the level of said bars at a point intermediately of the parallel legs 230a and 230b of the U-shaped gate member 226. Whenever an egg rolls over the gate member 226 in the manner described hereinbefore, it depresses the arm 262 which is effective to close momentarily the power circuit of the solenoid 250 opposite the end of the next higher rack 108. This projects the buffer-shaped head 252 of the armature of said solenoid momentarily into the path of the protruding finger tip 246 above the cup that receives the egg which actuated the switch 256. Thus, the protruding finger tip preceding the cup that just received an egg encounters a projected head 252 which cams it back into its tubular bearing 242. Hence, the finger 246 above a filled cup is unable to actuate any of the gate mechanisms 220 of the higher racks, and it is impossible therefore that said cup may accidentally receive another egg from any one of said higher racks.

In the circuit diagram shown in Fig. 14, the switches 256 have been individually identified by the suffix letters $a$, $b$, $c$, $d$, $e$, $f$, $g$, and $h$, respectively, corresponding to the quality racks 108a to 108h with which they are associated because the momentary closure of switch 256, as effected by escape of an egg from its corresponding rack 108 is not only effective to disable the gate opening finger 246 preceding the filled cup, it also energizes briefly a corresponding one of another set of solenoids 264a to 264h (Fig. 14) which are associated with the hereinbefore mentioned memory device. Upon energization, each of said solenoids sets a corresponding recording member in said device into a position representative of the quality of the eggs stored on the particular rack from which the switch-actuating egg passed onto the cup, in a manner and for a purpose described in greater detail in my aforementioned copending application.

After a cup on the ascending run of the elevator has risen above the level of the highest rack, 108 means become effective that tip it to the left, as viewed in Figs. 6 and 10 to cause an egg lying therein to roll onto the platform 266 of the egg weighing mechanism 118 while at the same time restoring the retracted gate opening finger of the cup to its protruding position in which it may effectively actuate a gate mechanism 220 upon return to the ascending run of the elevator. Having again reference to Figs. 9 and 10, the vertical stem 206 of each of the arms 208 that carry the cups, forms at its lower end an outwardly turned ear 268, and as a cup reaches its uppermost position, said ear is engaged by a stationary camming ledge 270 projecting laterally from the side wall 160 of the hereinbefore described cabinet 162. Contact with ledge 270 swings each arm 208 in counterclockwise direction as viewed in Figs. 9 and 10, against the urgency of the hereinbefore described spring 214 and thus tips the cup about its pivot 204 to the left at the very moment when it reaches the level of the weighing platform 266. Mounted in each ear 268 at the underside thereof is a round headed camming stud 272, and when said ear comes against the camming ledge 270 and is swung in counterclockwise direction on its pivot 204, said camming stud bears down upon the projecting left end of the trip finger 246 in the tubular bushings 242 and restores said finger to its effective forwardly projected position, wherein it may again actuate the first gate mechanism 220 that it will encounter.

While I have described my invention with the aid of a preferred embodiment, it will be understood that the constructional details described and shown in the accompanying drawings may be departed from without departing from the scope and spirit of my invention.

Also, while the machine of the invention as illustrated in the accompanying drawings and as described in the specification was specifically devised, and is employed for processing eggs, it will be understood that a machine embodying the principles of the invention may also be usefully employed to segregate other articles, such as avocados or other highly priced fruit.

I claim:

1. A supply chute for egg conveyors comprising a pair of inclined, transversely spaced parallel bars disposed in spaced vertical planes and having their lower ends bent to accentuate their inclinations, a U-shaped block having parallel legs connected by a cross bar, said block being supported between said lower ends for pivotal movement about an axis perpendicular to the vertical planes passing through said parallel bars and with its cross bar extending in the direction of said axis and with its legs arranged for pivotal movement about said axis in planes parallel to said vertical planes, a knee-shaped plate secured to the cross bar of said U-shaped block, said block being biased to pivot into a position wherein the legs of said block are disposed below the upper surfaces of said lower ends of said bars and the knee of said knee-shaped plate projects above said bars and blocks the chute formed by said bars, and stop means limiting the pivotal movement of said block and said plate to the defined position.

2. In an egg handling machine, conveyor means for advancing eggs, a pair of inclined, transversely spaced bars disposed in spaced vertical planes and forming a chute and adapted to receive eggs and to deliver them to said conveyor means, a U-shaped block supported between the lower ends of said bars for pivotal movement about an axis perpendicular to the vertical planes passing through said parallel bars and with its cross bar extending in the direction of said axis and with its legs arranged for pivotal movement in planes parallel to said vertical planes, a knee-shaped plate secured to the cross bar of said U-shaped block, said block being biased to pivot into a position wherein the legs of said block are disposed parallel to said lower ends of said bar and the knee of said knee-shaped plate projects above said bars and blocks the chute formed by said bars, and means activated by said conveyor means to lower the knees of said plate and to raise the legs of said block, whereby an egg is admitted to said plate and into engagement with the legs of said block to lower the same for delivery to said conveyor means and to reset said plate in blocking position.

3. In an egg handling machine, conveyor means operable to advance a series of cups adapted to support individual eggs thereon, an inclined supply chute adapted to receive eggs and deliver them to the cups of said conveyor means, a gate mechanism disposed at the discharge end of said chute, said gate mechanism being normally in a position effective to block said chute, and means associated with each cup and operative upon approach of an empty cut to disable said gate mechanism for delivering an egg to the empty cup, said means being rendered inoperative in response to the passage of an egg into its associated cup.

4. In an egg handling machine, conveyor means operable to advance a series of cups adapted to support individual eggs thereon, a series of chutes into which eggs are deposited and adapted to deliver such eggs to the cups of said conveyor means, a gate mechanism disposed at the discharge end of each of said chutes, said gate mechanism being normally effective to block its associated chute, means associated with each cup and operative upon approach of an empty cup to a chute to move its associated gate mechanism into chute unblocking position, and means associated with each cup and operative upon delivery of an egg thereinto to disable its gate unblocking means.

5. In an egg handling machine, conveyor means operable to advance a series of cups adapted to support individual eggs thereon, a series of chutes into which eggs are deposited and adapted to deliver such eggs to the cups of said conveyor means, a gate mechanism disposed at the discharge end of each of said chutes, said gate mechanism being normally effective to block its associated chute, means associated with each cup and operative upon approach of an empty cup to a chute to move its associated gate mechanism into chute unblocking position, electromagnetic means associated with each cup to disable its gate unblocking means, and a control circuit for each chute operated in response to the passage of an egg from its associated chute to a cup to activate the electromagnetic means associated with the cup having the egg delivered thereinto.

6. In an egg handling machine, conveyor means operable to advance a series of cups adapted to support individual eggs thereon, a series of chutes into which eggs are deposited and adapted to deliver such eggs onto the cups of said conveyor means, a gate mechanism disposed at the discharge end of each of said chutes, said gate mechanism being normally effective to block its associated chute, means associated with each cup and operative upon approach of an empty cup to a chute to disable its associated gate mechanism for passage of an egg onto the empty cup, and a control circuit for each chute operated in response to the passage of an egg from its associated chute onto the empty cup for rendering inoperative the gate disabling means associated with the empty cup receiving the egg.

7. In an egg handling machine conveyor means operable to advance a series of cups adapted to support individual eggs thereon, a series of chutes into which eggs are deposited and adapted to deliver such eggs onto the cups of said conveyor means, a gate mechanism disposed at the discharge end of each of said chutes, said gate mechanism being normally effective to block its associated chute, means associated with each cup and operative upon approach of an empty cup to a chute to disable its associated gate mechanism for passage of an egg onto the empty cup, a control circuit for each chute operated in response to the passage of an egg from its associated chute onto the empty cup for rendering inoperative the gate disabling means associated with the empty cup receiving the egg, and registering means operatively responsive to the operation of said control circuit.

8. In an egg handling machine, conveyor means for advancing eggs, a pair of inclined, transversely spaced bars forming a chute and adapted to deliver eggs onto said conveyor means, a knee-shaped plate pivotally supported between said bars near the lower end thereof, biasing means connected to said plate to urge it into position wherein the knee of said plate projects above said bars and blocks the chute formed by said bars, means mounting said biasing means for pivotal movement between said bars, means activated by said conveyor means to lower the knee of said plate for delivering an egg onto said conveyor means, switch actuating means pivotally supported at the lower end of said bars and arranged to be operated by contact with an egg upon passage of an egg from said chute onto said conveyor means, a control circuit having a switch therein operatively responsive to said switch actuating means being contacted by an egg, and a memory device recording member operatively responsive to the operation of said control circuit to make a record of the fact that an egg is being moved from said chute to said conveyor.

9. In an egg handling machine, an egg dispensing mechanism comprising a pair of spaced inclined bars forming a chute and adapted to support an egg for rolling movement thereon, a gate pivotally mounted between said bars intermediate the length of said chute, said gate having an upstream abutment member and a downstream abutment member disposed on opposite sides of the pivot axis of said gate, each abutment member being movable upwardly into the path of an advancing egg when the other abutment member is moved downwardly to a position below said bars, and means for pivoting said gate to lower said upstream abutment member and raise said downstream abutment member permitting an egg on said chute to gravitate over said upstream abutment member and strike said downstream abutment member, said gate being biased by said downstream abutment member so that the egg striking said downstream abutment member causes said gate to pivot in a direction to lower said downstream abutment member below the upper surfaces of said bars, whereby said upstream abutment member is raised in the path of the succeeding egg on said chute.

10. An article dispensing mechanism comprising a pair of spaced bars adapted to support articles for rolling movement thereon, a stop member supported for movement between a position projecting into the path of an article advancing on said bars and a position below said bars, biasing means connected to said stop member and supported for movement between a position below said bars and a position projecting into the path of an article advancing on said bars beyond said stop member, support means mounting said stop member and said biasing means for pivotal movement to alternate the projecting of said stop member and said biasing means into the path of an article advancing on said bars, and means connected to said support means for lowering said stop member from the position projecting into the path of an advancing article on said bars to the position below said bars to permit an article on said bars to advance over said stop member and for raising said biasing means from the position below said bars to the position projecting into the path of the article advancing over said stop member to permit the advancing article to contact said biasing means, the contact of the advancing article with said biasing means being effective to cause said biasing means to be lowered from the position projecting into the path of the advancing article to the position below said bars to permit the advancing article to pass over said biasing means, and the lowering of said biasing means being effective to raise said stop member to the position projecting into the path of a succeeding article.

11. An article dispensing mechanism comprising a pair of spaced bars adapted to support articles for rolling movement thereon, an abutment member supported for movement from a position projecting into the path of an article advancing on said bars to a position below said bars, biasing means connected to said abutment member and supported for movement from a position below said bars to a position projecting into the path of an article advancing on said bars beyond said abutment member, support means mounting said abutment member and said biasing means for pivotal movement to raise said biasing means when said abutment member is lowered and to raise said abutment member when said biasing means is lowered, means connected to said support means for lowering said abutment member from the position projecting into the path of an article advancing on said bars to the position below said bars to permit an article on said bars to advance over said abutment member and for raising said biasing means from the position below said bars to the position projecting into the path of an article advancing beyond said abutment member to permit the advancing article to contact said biasing means, the contact of the advancing article with said biasing means being effective to cause said biasing means to be lowered from the position projecting into the path of the advancing article to the position below said bars to permit the advancing article to pass over said biasing means, and the lowering of said biasing means being effective to raise said abutment member from the position below said bars to the position projecting into the path of a succeeding article.

12. An article dispensing mechanism comprising a pair of spaced bars adapted to support articles for rolling movement thereon, an abutment member supported for movement from a position projecting into the path of an article advancing on said bars to a position below said bars, biasing means connected to said abutment member and supported for movement from a position below said bars to a position projecting into the path of an article advancing on said bars beyond said abutment member, support means mounting said abutment member and said biasing means for pivotal movement to raise said biasing means when said abutment member is lowered and to raise said abutment member when said biasing means is lowered, means connected to said support means for lowering said abutment member from the position projecting into the path of an article advancing on said bars to the position below said bars to permit an article on said chute to advance over said abutment member and for raising said biasing means from the position below said bars to the position projecting into the path of an article advancing beyond said abutment member to permit the advancing article to contact said biasing means, whereby the contact of the advancing article with said biasing means causes said biasing means to be lowered from the position in the path of the advancing article to the position below said bars to permit the advancing article to pass over said biasing means, and whereby the lowering of said biasing means raises said abutment member from the position below said bars to the position projecting into the path of a suceeding article, and stop means limiting the pivotal movements of said abutment member and said biasing means.

References Cited in the file of this patent

UNITED STATES PATENTS

| | | |
|---|---|---|
| 1,020,746 | Dehler | Mar. 19, 1912 |
| 1,261,691 | Bunkley | Apr. 2, 1918 |
| 1,487,573 | Ingram | Mar. 18, 1924 |
| 1,619,015 | Bohn | Mar. 1, 1927 |
| 2,081,441 | Willshaw et al. | May 25, 1937 |
| 2,160,319 | Swartz | May 30, 1939 |
| 2,193,942 | Shackelford | Mar. 19, 1940 |
| 2,511,714 | Keller | June 13, 1950 |
| 2,571,977 | Warren | Oct. 16, 1951 |